US006904354B2

(12) United States Patent
Kuegel et al.

(10) Patent No.: US 6,904,354 B2
(45) Date of Patent: Jun. 7, 2005

(54) SYSTEM AND METHODS FOR CORRECTING THE INJECTION BEHAVIOR OF AT LEAST ONE INJECTOR

(75) Inventors: Peter Kuegel, Korntal-Münchingen (DE); Guenter Veit, Plochingen (DE); Ernst Kloppenburg, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/473,663

(22) PCT Filed: Apr. 9, 2002

(86) PCT No.: PCT/DE02/01294

§ 371 (c)(1),
(2), (4) Date: Mar. 31, 2004

(87) PCT Pub. No.: WO02/084095

PCT Pub. Date: Oct. 24, 2002

(65) Prior Publication Data

US 2004/0158384 A1 Aug. 12, 2004

(30) Foreign Application Priority Data

Apr. 10, 2001 (DE) ........................................ 101 17 810

(51) Int. Cl.[7] ................................................ B60T 7/12

(52) U.S. Cl. ....................... 701/104; 701/114; 701/105; 701/115; 701/103; 123/295; 123/495

(58) Field of Search ................................ 701/103, 104, 701/105, 114, 115; 123/295, 490

(56) References Cited

U.S. PATENT DOCUMENTS

| | | | | |
|---|---|---|---|---|
| 5,575,264 A | | 11/1996 | Barron et al. | |
| 6,021,638 A | * | 2/2000 | Hochmuth | 60/274 |
| 6,112,720 A | | 9/2000 | Matta et al. | |
| 6,512,974 B2 | * | 1/2003 | Houston et al. | 701/115 |
| 6,601,567 B2 | * | 8/2003 | Marceca et al. | 123/490 |
| 6,739,310 B2 | * | 5/2004 | Esteghlal et al. | 123/295 |

FOREIGN PATENT DOCUMENTS

| | | |
|---|---|---|
| EP | 1 026 384 | 8/2000 |
| FR | 2 775 318 | 8/1999 |

* cited by examiner

*Primary Examiner*—Tony M. Argenbright
*Assistant Examiner*—Johnny H. Hoang
(74) *Attorney, Agent, or Firm*—Kenyon & Kenyon

(57) ABSTRACT

A system and a method for correcting the injection characteristics of at least one injector, having a device for storing information and an arrangement for controlling the at least one injector, taking into account the stored information. The information may be ascertained by comparing setpoint values to actual values individually at a plurality of test points of at least one injector, and may be specific.

20 Claims, 5 Drawing Sheets

SYSTEM AND METHODS FOR CORRECTING THE INJECTION BEHAVIOR OF AT LEAST ONE INJECTOR

FIELD OF THE INVENTION

The present invention relates to a system for correcting the injection characteristics of at least one injector, having a device for storing information about the at least one injector and means for controlling the at least one injector, taking into account the stored information. The invention also relates to a method for correcting the injection characteristics of at least one injector, including the steps: storing information about the at least one injector, and controlling the at least one injector taking into account the stored information.

BACKGROUND INFORMATION

Electrically driven injectors for injecting fuel are used, for example, within the framework of common-rail systems. In common-rail fuel injection, pressure generation and fuel injection are decoupled. The injection pressure is generated independently of the engine speed and the injected fuel quantity, and is ready in the "rail" for the injection. The start of injection and the injected fuel quantity are calculated in the electronic engine control unit, and are converted by an injector at each engine cylinder via a remote-controlled valve.

Because of their mechanical manufacturing tolerances, such injectors have different fuel-quantity maps. The relationship between the injected fuel quantity, the rail pressure and the triggering time may be understood by a fuel-quantity map. The result may be that, in spite of electrically defined control, each individual injector fills the combustion chamber with different quantities of fuel.

To achieve the lowest possible fuel consumption while adhering to strict exhaust-gas standards, and to achieve very smooth running, the injectors in operation may exhibit only very small tolerances with regard to the injected fuel quantity. It is not possible to adhere to these required low tolerances because of the mechanical manufacturing tolerances. To nevertheless ensure a defined injected fuel quantity for the injectors, after production, the injectors are measured at characteristic operating points for their injected fuel quantity and are arranged in classes. In operation, the specific class must be known to the engine control unit, so that the control may be adapted to the special features of the class, in a manner specific to the injector.

If such a correction of the tolerances by the engine control unit is not possible based on the knowledge of the class, then the special injectors must be reworked mechanically.

There are numerous possibilities for storing the class information on the injector, for example, by various codes, such as by bar code, by resistors on the injector or by plain text on the injector. If the class information is stored on the injector by a code, the information is communicated to the control unit by a code recognition and subsequent programming. If the class information is stored with the aid of resistors on the injectors, the information may be read out automatically by the control unit. However, additional electric lines are necessary. Clear text may be recognized using a camera.

Moreover, it is possible to provide electronic storage possibilities in the injectors, in which, for example, the class information is stored. The control unit is able to read out these values from the injector via an interface and use them in the following operation. However, in this design approach, it is disadvantageous that a separate interface is necessary between the control unit and the injectors.

The injectors may be classified, for instance, by checking the injectors at various tests points with respect to the injected fuel quantity metering. If the measured actual values at all test points lie within a predetermined tolerance window, the injector is evaluated as good. Furthermore, the actual value of one measuring point is used to divide the injectors into three tolerance classes. The tolerance windows of the respective classes each amount to ⅓ of the total tolerance at this test point. Since only an insufficient correlation exists between the test points, a tolerance narrowing at the remaining test points is not possible. Once the injectors have been installed on the engine, the class membership is programmed into the control unit allocated to the engine. The control unit then corrects the injected fuel quantity for the upper and lower class according to a preassigned map. The middle class is not corrected. Because of the poor correlation between the operating points, i.e. the test points, the correction is possible only in the range of the test point used for the classification. In the remaining operating range, at most a slight adaptation of the quantity metering may be carried out on the basis of statistical mean-value shifts between the classes.

SUMMARY OF THE INVENTION

An exemplary embodiment of present invention may offer the advantage that the information may be ascertained by comparing setpoint values to actual values, and that the information may be specific individually to a plurality of test points of at least one injector. In the systems of the related art which utilize the class information, the control unit is only able to make corrections on the basis of this class information. In contrast, in the system of the present invention, the control unit receives precise information about a plurality of test points, i.e. operating points, of each individual injector.

Therefore, by measures in the control unit, the triggering duration may be corrected vis-a-vis the nominal map individually for each injector as a function of the setpoint quantity and rail pressure, in order to come as close as possible to the setpoint quantity. During installation, the control unit receives several, for example, four test values (VL, EM, LL and VE) per injector from the production. A correction quantity map may be set up from these variables.

For that purpose, the injected-fuel-quantity correction for a series of pressure/triggering combinations may be determined from the deviations of the injected fuel quantities from their setpoint values of the test values (VL, EM, LL and VE) at the four test points. With the aid of these pressure/triggering combinations, for each test point, a correlation of the injected fuel quantity to the injected fuel quantity at one test point is determined. Therefore, given known values for quantity deviations ($\Delta$VL, $\Delta$EM, $\Delta$LL and $\Delta$VE) at the respective test points, the control unit is able to fill the correction-quantity map with numerical values.

Because of the extensive correction possibilities on the basis of the present invention, it is possible to permit greater tolerances with respect to the four production test values, and thus to increase the good output of the production.

The means for controlling the injectors may be integrated in an engine control unit. Since the engine control unit is provided for controlling the injectors, it may be advantageous if the injector-specific control is also undertaken with the accompanying correction by the engine control unit.

The information pertains to correction quantities for the fuel-quantity map of the least one injector. The abundant injector-specific information may be used by the control unit for the injector-specific control. However, reliable control of the injected fuel quantity results when the fuel-quantity map of every injector is measured, and these measured actual values are compared to setpoint values. From the comparison, correction quantities may be ascertained which may then be taken into account by the control unit for the control.

It may be advantageous that the device for storing information is a data memory secured on the injector. A great quantity of data may be accommodated conveniently in such a data memory. Furthermore, it is useful that, by reading out from the data memory, the control unit may be able to obtain the data directly for continuing processing.

It may be advantageous that the device for storing information is implemented by resistors disposed on the injector. Such a coding of the information also offers the possibility of reading the information into the control unit in an automated manner.

The device for storing information may be implemented by a bar code applied on the injector. Such a bar code may be scanned, so that the information is directly available to the control unit in this design approach, as well.

The device for storing information may be implemented by an alphanumeric encoding on a labeling field of the injector. In this exemplary embodiment, the control unit may be programmed manually. The alphanumeric encoding may be picked up by a camera, so that in this way, the control unit may again be programmed automatically.

In one exemplary embodiment, the device for storing information is an integrated semiconductor circuit (IC) configured on the injector. Such an IC may be integrated in the head of an injector. The data used by the control unit may be stored in the IC in a nonvolatile memory.

In this connection, it may be advantageous that the engine control unit has an integrated semiconductor circuit (IC). The information stored in integrated semiconductor circuits of the injectors may be processed by such an integrated semiconductor circuit in the engine control unit, thus ultimately permitting the injector-specific control.

The system may be advantageous in that, by comparing setpoint values to actual values, it is determined whether the injector lies within a predefined tolerance range; that the information to be stored is ascertained for the injectors lying within the predefined tolerance range; that an individual correction map is calculated for each injector by the engine control unit from the stored information; and that the injected fuel quantity and/or the start of injection is/are corrected in accordance with the correction maps. Thus, by comparing setpoint values to actual values, it may first be determined whether the injector is usable at all. If the injector is once evaluated as good, the setpoint values and the actual values may be used again to determine adjustment values (correction quantities). After the values have been programmed into the control unit, the control unit then calculates an individual injected-fuel-quantity-correction map with the aid of these correction quantities, so that ultimately a corrected fuel-quantity metering of great accuracy may take place.

According to the method of the present invention, the information may be ascertained by comparing setpoint values to actual values, and the information may be specific individually to a plurality of test points of at least one injector. Therefore, the method of the present invention offers an injector-specific control which may go beyond the control on the basis of a classification.

The method may be used advantageously when an engine control unit is utilized for controlling the injectors. Thus, the method may be implemented using a component present in injection systems in any case.

Correction quantities of the plurality of test points may be used in the method as information for determining the injected-fuel-quantity-correction map. Abundant injector-specific information may be may be used by the control unit for the injector-specific control.

However, the injected-fuel-quantity-correction map, that is, the relationship between the injected fuel quantity, the rail pressure and the trigger time, may offer good possibilities for offsetting tolerances by an injector-specific control.

It may be advantageous to determine at least one correction quantity by at least one comparison of the setpoint value to the actual value at the plurality of test points of an injector.

In an exemplary embodiment of the invention, the correction quantity is ascertained by linear regression of a plurality of comparisons of the setpoint values to the actual values at the plurality of test points of an injector.

According to the present invention, correction quantity $\Delta Q_{(n)}$ in injected-fuel-quantity-correction map MKK may be calculated from the product of correction value $KW_{(n)}$ and quantity deviation $\Delta VE_{dev.\ (n)}/\Delta EM_{dev.\ (n)}/\Delta LL_{dev.(n)}/\Delta LL_{dev.(n)}$ of the respective test points, ascertained from the comparison of the setpoint value to the actual value, according to the formula:

$$\Delta Q_{(n)}=KW_{(n)}\cdot\Delta VE_{dev.(n)}$$

$$\Delta Q_{(n)}=KW_{(n)}\cdot\Delta EM_{dev.(n)}$$

$$\Delta Q_{(n)}=KW_{(n)}\cdot\Delta VL_{dev.(n)}$$

$$\Delta Q_{(n)}=KW_{(n)}\cdot\Delta LL_{dev.(n)}$$

Moreover, in another exemplary embodiment of the invention, certain test points are correlated with each other. By correlating several test points, effects of measuring errors of the test points may be further reduced.

In another exemplary embodiment of the invention, the correction quantity is ascertained by the linear regression of a plurality of comparisons of the setpoint values to the actual values of at least two correlating test points of an injector in a compensating plane.

Furthermore, in another exemplary embodiment of the invention, correction quantity $\Delta Q_{(n)}$ in injected-fuel-quantity-correction map MKK for the case of ascertaining correction values $KW_{(n)}$ at two correlating test points of an injector in the compensating plane, may be calculated according to the following dependency. Correction quantity $\Delta Q_{(n)}$ is then calculated from the sum of the products of correction value $KW_{(n)}$ and quantity deviations $\Delta VE_{dev.(n)}$ and $\Delta EM_{dev.(n)}$, respectively, ascertained from the setpoint-value to actual-value comparison, of the two correlating test points, according to the formula:

$$\Delta Q_{(1,2)}=KW_{(1)}*\Delta VE_{dev.(1)}+KW_{(2)}*\Delta EM_{dev.(2)}$$

In this context, quantity deviations $\Delta VE_{dev.(n)}$ and $\Delta EM_{dev.(n)}$ with their correction values $KW_{(1)}$ and $KW_{(2)}$ represent merely an example for calculating correction quantity $\Delta Q_{(1,2)}$. Basically, a calculation of correction quantity $\Delta Q_{(n)}$ is possible with any number of quantity deviations at all.

Furthermore, an average quadratic deviation (RMSE) may be advantageously utilized as a measure for the fit of the regression for the comparison of the actual values to the setpoint values on the linear regression curve or the linear compensating plane. In this context, it advantageously holds that, in the case of at least two correlating test points, in the comparison of the setpoint values, given identical measuring errors, the average quadratic deviation is less in the compensating plane than in the comparison of the setpoint values with the actual values on the linear regression curve.

In another exemplary embodiment of the present invention, the possibility exists that, if there is a great deal of test data from very many injectors, the correction quantities are ascertained by non-linear linkages of a plurality of comparisons of the setpoint values to the actual values of a plurality of test points on non-linear regression curves and/or in non-linear compensating planes.

The method may be advantageous in that, by the comparison of setpoint values to actual values, it may be ascertained whether the injector lies within a predefined tolerance range; that the information to be stored is ascertained for the injectors lying within the predefined tolerance range; that an individual injected-fuel-quantity-correction map is calculated for each injector by the engine control unit from the stored information; and that the injected fuel quantity and/or the start of injection is/are corrected in accordance with the injected-fuel-quantity-correction maps.

DETAILED DESCRIPTION

Figure 1:
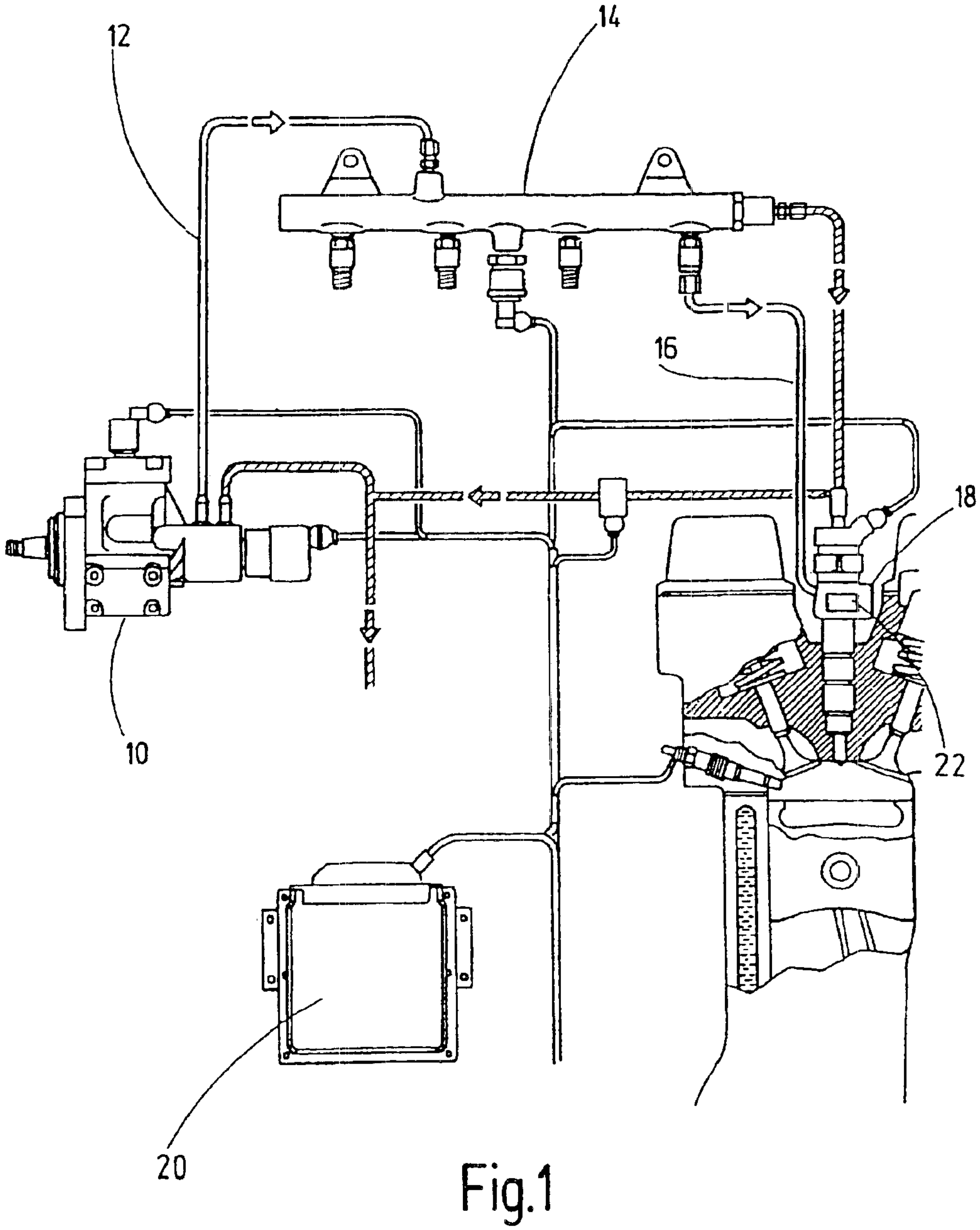
FIG. 1 shows a schematic diagram of an exemplary embodiment of a part of a common rail system according to the present invention.

FIG. 1 shows the high-pressure stage of the common-rail fuel injection system. The configuration includes a high-pressure pump 10 connected to high-pressure accumulator ("rail") 14 via a high-pressure delivery line 12. High-pressure accumulator 14 is connected to the injectors via further high-pressure delivery lines. One high-pressure delivery line 16 and one injector 18 are shown in the present representation. Injector 18 is installed in the engine of a motor vehicle. The system shown is controlled by an engine control unit 20. For example, injector 18 may be controlled by engine control unit 20.

A device 22 for storing information relating individually to injector 18 is provided on injector 18. The information stored in device 22 may be taken into account by engine control unit 20, so that each injector 18 may be controlled individually. The information may concern correction values for the fuel-quantity map of injector 18. Device 22 for storing information may be implemented as a data memory, as one or more electrical resistors, as bar code, by alphanumeric encoding or by an integrated semiconductor circuit arranged on injector 18. Engine control unit 20 may likewise have an integrated semiconductor circuit for evaluating the information stored in device 22.

Figure 2:
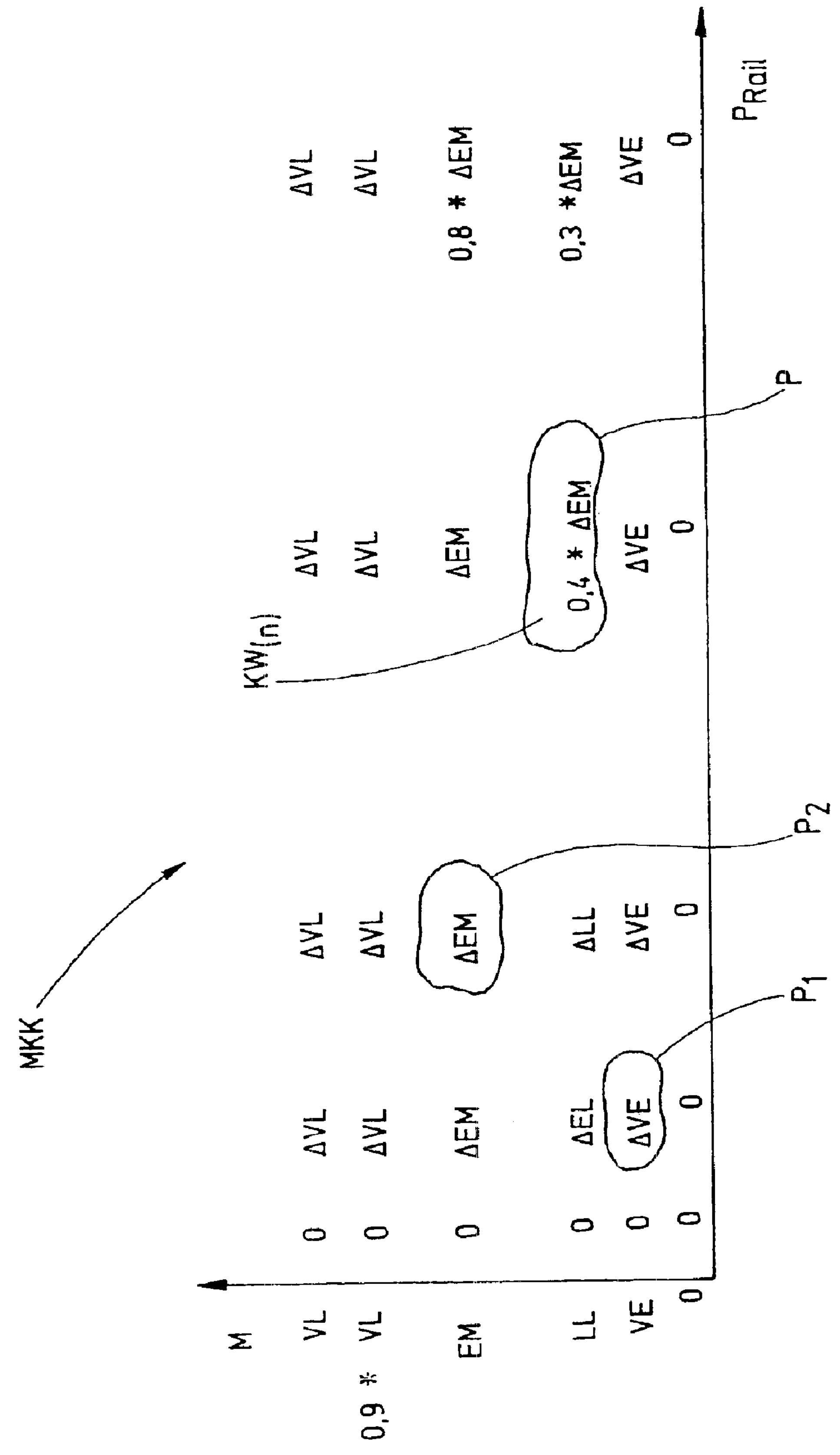
FIG. 2 shows an injected-fuel-quantity-correction map as a diagram of the dependence of the injected fuel quantity on the rail pressure, according to an exemplary embodiment of the present invention.

FIG. 2 shows a diagram for clarifying the present invention. The diagram shows an injected-fuel-quantity-correction map MKK, a quantity M metered by injector 18 being plotted against a rail pressure $p_{rail}$. Injected-fuel-quantity-correction map MKK is based on a plurality of injection points (VL, EM, LL, VE). Adjustment values ΔVL, ΔEM, ALL and ΔVE are used for quantity correction M, which are ascertained by comparing setpoint values to actual values at various rail pressures $p_{rail}$ at different test points. A correction value $KW_{(n)}$ may be allocated to adjustment values ΔVL, ΔEM, ΔLL and ΔVE. For example, allocated to injected fuel quantity M at a test point P may be adjustment value ΔEM as a function of a pressure (rail pressure/triggering duration combination) of injection EM, from which a correction quantity $\Delta Q_{(n)}$ may be determined for the control unit at the respective test point. Computational correction quantities $\Delta Q_{(n)}$ are based on the adjustment values, ascertained from quantity deviations $\Delta VL_{dev.(n)}$, $\Delta EM_{dev.(n)}$, $\Delta LL_{dev.\ (n)}$ and $\Delta VE_{dev.(n)}$ at the respective test points, and associated ascertained correction values $KW_{(n)}$. For example, in FIG. 2, a correction value $KW_{(n)}$ is allocated to test point P ΔEM.

Furthermore, numerous test points P may be provided for one injector 18; they may be obtained over the entire operating range and injected-fuel-quantity-correction map MKK. The adjustment values may also be interpolated linearly between the interpolation points defined by test points P, so that a reliable fuel-quantity metering may ultimately be carried out in the entire operating range.

Figure 3:
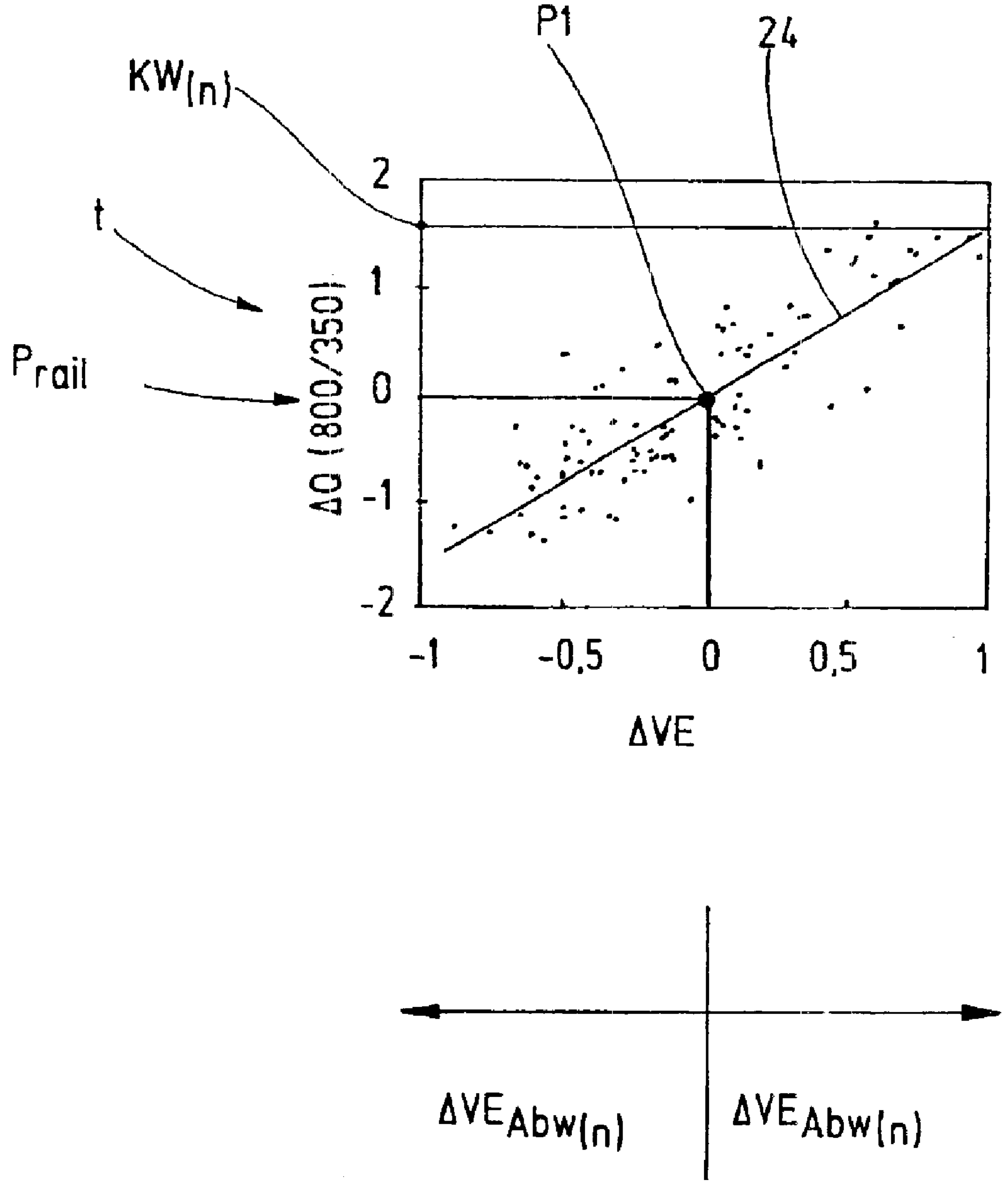
FIG. 3 shows a diagram of the correction quantity, given a constant rail pressure and a constant injection time as a function of the quantity deviation at one test point, according to an exemplary embodiment of the present invention.
Figure 4:
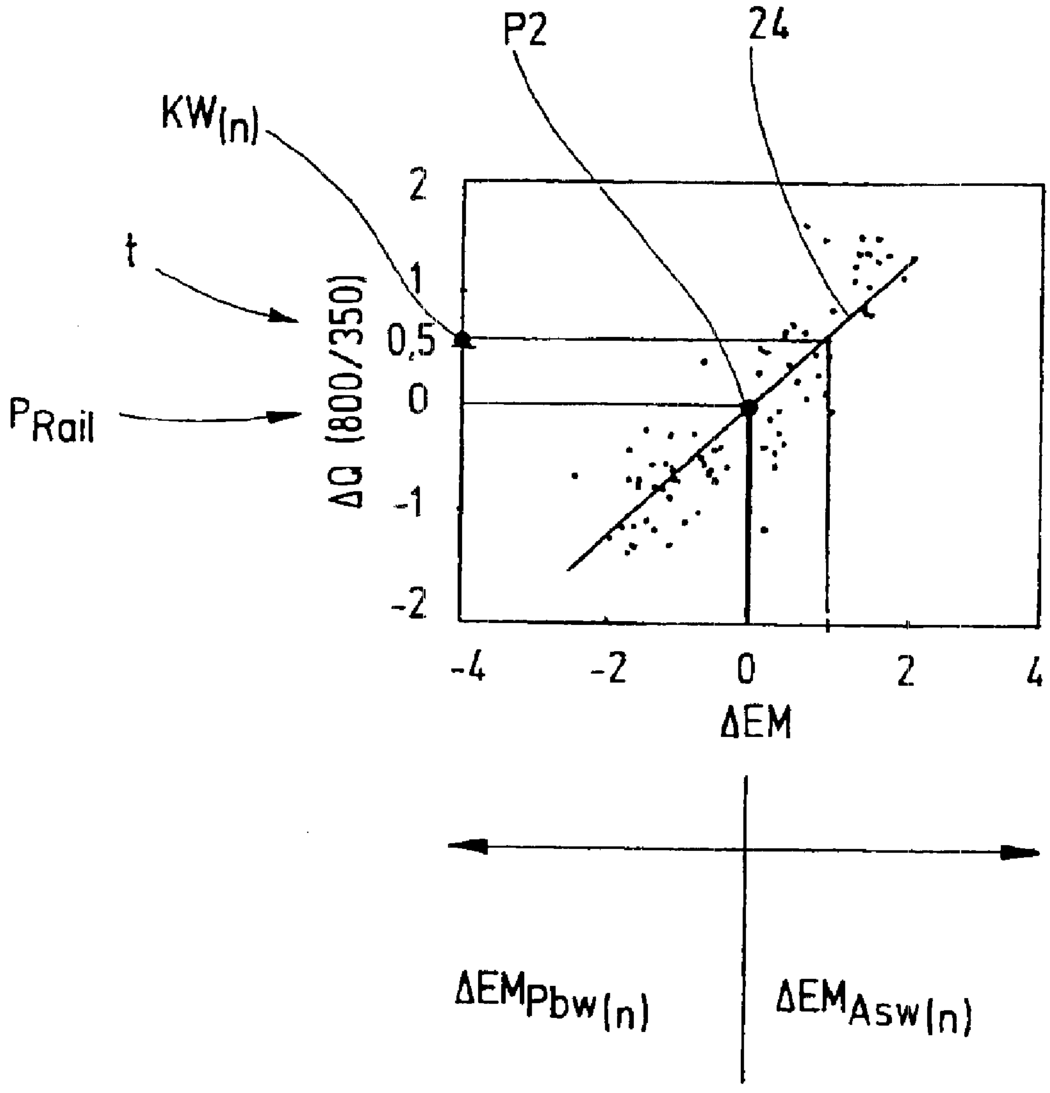
FIG. 4 shows a diagram of the correction quantity, given a constant rail pressure and a constant injection time as a function of the quantity deviation at another test point, according to an exemplary embodiment of the present invention.
Figure 5:
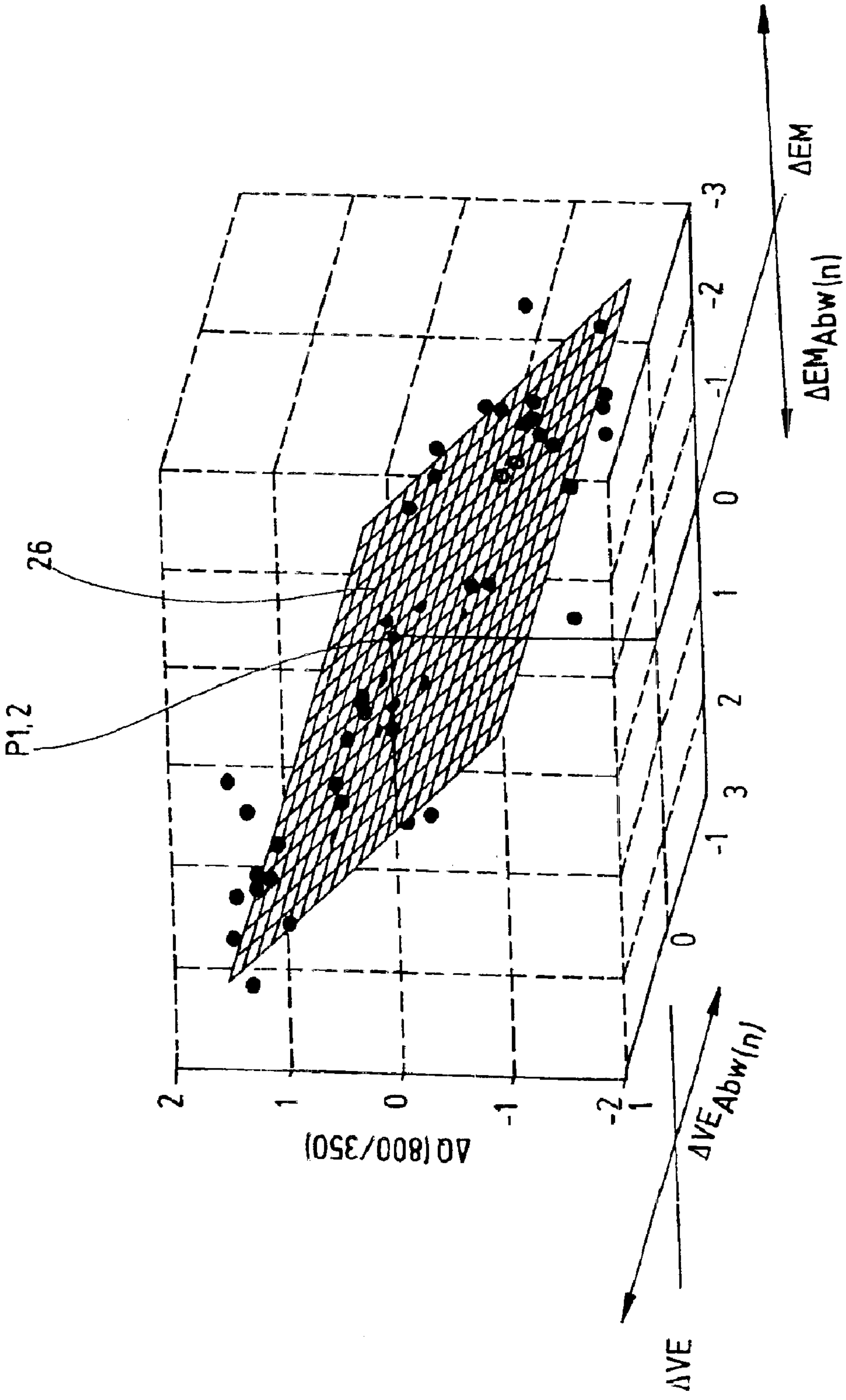
FIG. 5 shows a diagram of the correction quantity, given a constant rail pressure/triggering combination and a constant injection time as a function of the quantity deviation between two correlating test points of an injector, according to an exemplary embodiment of the present invention.

FIGS. 3 through 5 illustrate some aspects of how injected-fuel-quantity correction $\Delta Q_{(n)}$ may be determined for the specific test point, according to exemplary embodiments of the present invention.

FIG. 3 shows a diagram of correction quantity $\Delta Q_{(n)}$ at a constant rail pressure $p_{rail}$ and a constant injection time t as a function of quantity deviation $\Delta VE_{dev.(n)}$. FIG. 3 shows test point P1 at rail pressure $p_{rail}$=800 bar and injection time t=350 μs. Based on the measurement data resulting from the comparisons of setpoint values to actual values—represented in FIG. 3 as black dots—after a mathematically linear regression, a linear regression curve 24 is obtained. It clarifies which correction quantity $\Delta Q_{(n)}$ is necessary, given a deviation $\Delta VE_{dev.(n)}$ from the setpoint value at test point P1. The possible correction value $KW_{(n)}$ able to be utilized for calculating correction quantity $\Delta Q_{(n)}$ may be obtained from the slope of linear regression curve 24. For example, for test point P1 shown in FIG. 3, the slope yields a correction value of 1.6, which is used as a factor for ascertained quantity deviation $\Delta VE_{dev.(n)}$ for determining correction quantity $\Delta Q_{(n)}$. The formula for this is:

$$\Delta Q_{(1)}=KW_{(1)}*\Delta VE_{dev.(1)}$$

In a diagram, FIG. 4 shows correction quantity $\Delta Q_{(n)}$ at another test point P2, at the same rail pressure $p_{rail}$ and the same injection time t as in FIG. 3. Linear regression curve 24 is again depicted, which results from the measurement data —black dots—yielded from the comparisons of the setpoint values to the actual values, a value, for example, of 0.6 resulting from the slope of linear regression curve 24 as correction value $KW_{(n)}$. At this test point, correction quantity $\Delta Q_{(n)}$ is likewise calculated as the product of correction value $KW_{(n)}$ and quantity deviation $\Delta EM_{dev.(n)}$ at test point P2 according to the formula:

$$\Delta Q_{(2)}=KW_{(2)}\cdot\Delta EM_{dev.(2)}$$

FIG. 5 shows a diagram of correction quantity $\Delta Q_{(n)}$, given the same constant rail pressure $p_{rail}$ and the same constant injection time t as a function of the quantity deviation as in FIGS. 3 and 4, but between two correlating test points of an injector, e.g. P1 and P2. In this case, the two correlating test points P1 and P2 are represented in a compensating plane 26 determined by linear regression. On the basis of the black dots depicted, one recognizes the basic data created by the setpoint value/actual value comparison, and used as the basis for the mathematical ascertainment of a compensating plane 26 with the aid of linear regression. The constant, exemplary values for rail pressure $p_{Rail}$=800 bar and injection time t=350 $\mu$s already shown in FIG. 3 and FIG. 4 have also been indicated in FIG. 5. A correction quantity $\Delta Q_{(n)}$ to be calculated is likewise yielded from FIG. 5, which is calculated from the sum of the products of correction value $KW_{(n)}$ with quantity deviation $\Delta VE_{dev.(n)}$ and $\Delta EM_{dev.(n)}$, respectively, in this case at test points P1 and P2, where $$\Delta Q_{(1,2)}=KW_{(1)}*\Delta VE_{dev.(1)}+KW_{(2)}*\Delta EM_{dev.(2)}$$

By the superimposition of two correlating test points P1 and P2 with the aid of compensating plane 26, corresponding correction values $KW_{(1)}$ and $KW_{(2)}$, respectively, result from the slope of compensating plane 26, which differ from the correction values of the linear regression curves, as clarified in FIGS. 3 and 4.

In comparison to an average quadratic deviation RMSE of linear regression curves 24 of FIG. 3 or 4, the respective, mathematical, average, quadratic deviation RMSE in a calculation of correction quantity $\Delta Q_{(1,2)}$ (FIG. 5) is lower than in a calculation of $\Delta Q_{(1)}$ and $\Delta Q_{(2)}$, respectively. Average quadratic deviation RMSE may be calculated according to the mathematical methods.

The correction quantity $\Delta Q_{(1,2)}$, i.e. its associated correction values $KW_{(1)}$ and $KW_{(2)}$, may be represented more precisely by two-dimensional compensating plane 26 (FIG. 5) than by a one-dimensional model using linear regression curves 24.

For quantity deviation $\Delta VE_{dev.(n)}$ and $\Delta EM_{dev.(n)}$, it holds true that the standard deviation on linear regression curves 24 (FIGS. 3 and 4) is greater than the ascertained standard deviation in a compensating plane 26 formed by linear regression (FIG. 5). The standard deviations are likewise calculated according to the mathematical methods.

Therefore, from injected-fuel-quantity-correction map MKK (FIG. 2) correction quantities $\Delta Q_{(n)}$ may be calculated by the control unit from basic data of different quantity and quality. Correction quantities $\Delta Q_{(n)}$ are thus based on different calculation models.

In a first calculation model, correction quantities $\Delta Q_{(n)}$ may be calculated on the basis of the data of a simple setpoint value/actual value comparison at respective test point P of injected-fuel-quantity-correction map MKK.

In a second calculation model, correction quantities $\Delta Q_{(n)}$ may be ascertained from basic data at respective test points P1 or P2 according to the method indicated by FIGS. 3 and 4, incorporated into injected-fuel-quantity-correction map MKK and calculated.

In a third calculation model, correction quantities $\Delta Q_{(n)}$ may be incorporated into injected-fuel-quantity-correction map MKK and calculated from basic data, which was ascertained at at least two linked test points P1 and P2 of an injector 18 according to the method described in FIG. 5.

In a fourth calculation model, correction quantities $\Delta Q_{(n)}$ may be calculated from basic data at at least two linked correlating test points P1 and P2 of an injector 18 using a nonlinear function, and incorporated into injected-fuel-quantity-correction map MKK. For this case, however, a great amount of test data of correlating test points P may then be needed in order to be able to take appropriate nonlinear dependencies as a basis.

Depending on the quantity and quality of the basic data, the accuracy according to the first calculation method may be the lowest, and according to the fourth calculation method may be the highest.

This may allow a more precise injection of injected fuel quantity M when using the calculation models having the greatest accuracy.

The preceding description of the exemplary embodiments according to the present invention may be used only for illustrative purposes, and not for the purpose of limiting the present invention. Various changes and modifications are possible within the framework of the present invention, without departing from the scope of the invention or its equivalents.

What is claimed is:

1. A system for correcting an injection characteristic of at least one injector, comprising:

a storing arrangement to store information of the least one injector, wherein the storing arrangement includes resistors disposed on the at least one injector; and a controlling arrangement to control the at least one injector, taking into consideration the stored information;

wherein the information is ascertained by comparing setpoint values to actual values individually at at least three operating points of the at least one injector and is valid for the at least one injector, correction quantities at the operating points being used in each case for determining an injected-fuel-quantity-correction map.

2. The system of claim 1, wherein the storing arrangement includes a data memory secured on the at least one injector.

3. The system of claim 1, wherein the storing arrangement includes a bar code applied on the at least one injector.

4. The system of claim 1, wherein the storing arrangement includes an alphanumeric encoding on a labeling field of the at least one injector.

5. The system of claim 1, wherein the storing arrangement includes an integrated semiconductor circuit arranged on the at least one injector.

6. The system of claim 1, wherein the controlling arrangement includes an integrated semiconductor circuit.

7. The system of claim 1, wherein:

by comparing setpoint values to actual values, it is determined whether the at least one injector lies within a predefined tolerance range;

the information to be stored is ascertained for the at least one injector lying within the tolerance range;

the individual injected-fuel-quantity-correction map is calculated for the at least one injector by the engine control unit from the stored information; and at least one of the injected fuel quantity and the point of injection is corrected in accordance with the injected-fuel-quantity-correction map.

8. A method for correcting an injection characteristic of at least one injector, comprising:

storing in a storing arrangement the information about the at least one injector, wherein the storing arrangement includes resistors disposed on the at least one iniector; and controlling the at least one injector, taking into account the stored information;

wherein:

the information is ascertained by comparing setpoint values to the actual values at at least three operating points of the at least one injector and is valid for the injector, correction quantities at the at least three operating points is used as information, and the correction quantities at the operating points are used for determining an injected-fuel-quantity-connection map.

9. The method of claim 8, wherein the correction quantities are ascertained by at least one comparison of the setpoint value to the actual value at the operating points of the at least one injector.

10. The method of claim 8, wherein the correction quantity is ascertained by linear regression of comparisons of the setpoint values to the actual values at the operating points of the at least one injector on a linear regression curve.

11. The method of claim 8, wherein the correction quantities are ascertained by linear regression of comparisons of the setpoint values to the actual values of at least two correlating operating points of the at least one injector in a compensating plane.

12. The method of claim 9 or 10, wherein the correction quantity in the injected-fuel-quantity-correction map is calculated from a product of a correction value and a quantity deviation of $\Delta VE_{dev.(n)}/EM_{dev.(n)}/\Delta VL_{dev.(n)}/\Delta LL_{dev.(n)}$ of the operating points is ascertained from the comparison of the setpoint value to the actual value, according to:

$$\Delta Q_{(n)}=KW_{(n)}\cdot\Delta VE_{dev.(n)};$$

$$\Delta Q_{(n)}=KW_{(n)}\cdot\Delta EM_{dev.(n)};$$

$$\Delta Q_{(n)}=KW_{(n)}\cdot\Delta VL_{dev.(n)};$$

$$\Delta Q_{(n)}=KW_{(n)}\cdot\Delta LL_{dev.(n)}.$$

13. The method of claim 11, wherein the correction quantity in the injected-fuel-quantity-correction map is calculated as a sum of the products of correction values and the quantity deviations of $\Delta VE_{dev.(n)}$ and $\Delta EM_{dev.(n)}$, respectively, of the two correlating operating points of the at least one injector, ascertained from the comparison of the setpoint value to the actual value, according to:

$$\Delta Q_{(1,2)}=KW_{(1)}*\Delta VE_{dev.(1)}+KW_{(2)}*\Delta EM_{dev.(2)}.$$

14. The method of claim 10 or 11, wherein an average quadratic deviation is used as a measure of an approximation of the comparisons of the actual values to the setpoint values one of on the linear regression curve and in the compensating plane.

15. The method of claim 14, wherein when comparing the setpoint values to the actual values of at least two correlating operating points, the average quadratic deviation becomes smaller in the compensating plane.

16. The method of claim 10 or 11, wherein a standard deviation of the correction quantity one of on the linear regression curve and in the compensating plane is ascertained by comparing the setpoint values to the actual values at the operating points.

17. The method of claim 16, wherein given the same measuring errors, the standard deviation becomes smaller in the compensating plane.

18. The method of claim 9, wherein the correction quantities are ascertained by nonlinear linkages of comparisons of the setpoint values to the actual values of operating points of the least one injector at least one of on nonlinear regression curves and in nonlinear compensating planes.

19. The method of claim 8, wherein:

by comparing setpoint values to actual values, it is determined whether the at least one injector lies within a predefined tolerance range;

the information to be stored is ascertained for the at least one injector lying within the tolerance range;

the individual injected-fuel-quantity-correction map for the at least one injector is calculated by the engine control unit from the stored information; and at least one of the injected fuel quantity and the point of injection is corrected in accordance with the correction values of the injected-fuel-quantity-correction maps.

20. A system for correcting an injection characteristic of at least one injector, comprising:

a storing arrangement to store information of the at least one injector; and a controlling arrangement to control the at least one injector, taking into consideration the stored information;

wherein the stored information is ascertained by comparing setpoint values to actual values individually at at least three operating points of the at least one injector, and wherein the stored information is used to determine an injected-fuel-quantity-correction characteristics map for substantially entire range of operating points for the at least one injector.

* * * * *

UNITED STATES PATENT AND TRADEMARK OFFICE

CERTIFICATE OF CORRECTION

PATENT NO. : 6,904,354 B2 Page 1 of 1
DATED : June 7, 2005
INVENTOR(S) : Peter Kuegel et al.

It is certified that error appears in the above-identified patent and that said Letters Patent is hereby corrected as shown below:

Column 9,
Line 34, change "$\Delta VE_{dev.(n)}/EM_{dev.(n)}/\Delta VL_{dev\cdot(n)}/\Delta LL_{dev.(n)}$" to
-- $\Delta VE_{dev.(n)}/\Delta EM_{dev.(n)}/\Delta VL_{dev.(n)}/\Delta LL_{dev.(n)}$ --.

Signed and Sealed this

Seventeenth Day of January, 2006

JON W. DUDAS
*Director of the United States Patent and Trademark Office*